(12) United States Patent
Senkpiel

(10) Patent No.: US 8,763,648 B2
(45) Date of Patent: Jul. 1, 2014

(54) COLD-INSULATED PIPE SUPPORT AND INSTALLATION

(75) Inventor: Florian Senkpiel, Zeven (DE)

(73) Assignee: LISEGA Aktiengesellschaft, Zeven (DE)

( * ) Notice: Subject to any disclaimer, the term of this patent is extended or adjusted under 35 U.S.C. 154(b) by 335 days.

(21) Appl. No.: 13/148,562

(22) PCT Filed: Feb. 3, 2010

(86) PCT No.: PCT/EP2010/051317
§ 371 (c)(1),
(2), (4) Date: Aug. 9, 2011

(87) PCT Pub. No.: WO2010/089328
PCT Pub. Date: Aug. 12, 2010

(65) Prior Publication Data
US 2011/0309207 A1 Dec. 22, 2011

(30) Foreign Application Priority Data
Feb. 9, 2009 (DE) .......... 10 2009 008 140

(51) Int. Cl.
*F16L 9/14* (2006.01)
(52) U.S. Cl.
USPC ............ 138/149; 248/53; 248/49; 138/177; 138/178
(58) Field of Classification Search
USPC ........ 248/49, 53, 65; 138/106, 149, 172, 177, 138/178
See application file for complete search history.

(56) References Cited

U.S. PATENT DOCUMENTS 4,804,158 A 2/1989 Collins et al.
5,851,330 A * 12/1998 Cridland et al. .............. 156/229

(Continued)

FOREIGN PATENT DOCUMENTS

DE 1892882 3/1964
DE 8615502 10/1987

(Continued)

OTHER PUBLICATIONS

PCT International Search Report dated May 20, 2010 received in corresponding PCT Application No. PCT/EP2010/051317.

(Continued)

*Primary Examiner* — Alfred J Wujciak
(74) *Attorney, Agent, or Firm* — Grossman Tucker Perreault & Pfleger, PLLC

(57) ABSTRACT

The invention relates to a cold-insulated pipe support for a pipeline (R), in particular for a low-temperature pipeline, comprising a pipe receptacle (2) that delimits a receiving space for a pipe section of the pipeline (R) and comprising a holding device (7) for absorbing and transmitting forces and torques acting on the pipeline (R) and on a base (B). The invention further relates to a method for installing the pipe support. With the objective of an inexpensive construction and low loading of the pipeline (R) in operation, it proposed that the holding device (7) comprise a stop apparatus (8) having at least one stop element (9) for absorbing and transmitting axial pipe forces to the pipe receptacle (2) and/or to the base (B) and that the stop element (9) be fixed in the installation position on a narrow-surfaced side surface (12) on the outside of the pipeline (R), wherein the side surface extends longitudinally in the axial direction (x) in the installation position and is designed as a connecting side surface (10). In order to apply force to the pipe receptacle (2), a ring element (16) can be provided between the stop element (9) and the pipe receptacle (2), wherein the ring element is brought radially over the pipeline (R) in the form of two ring sectors, which are welded together to form the ring element (16).

19 Claims, 12 Drawing Sheets

(56) References Cited

U.S. PATENT DOCUMENTS

Figure 1:
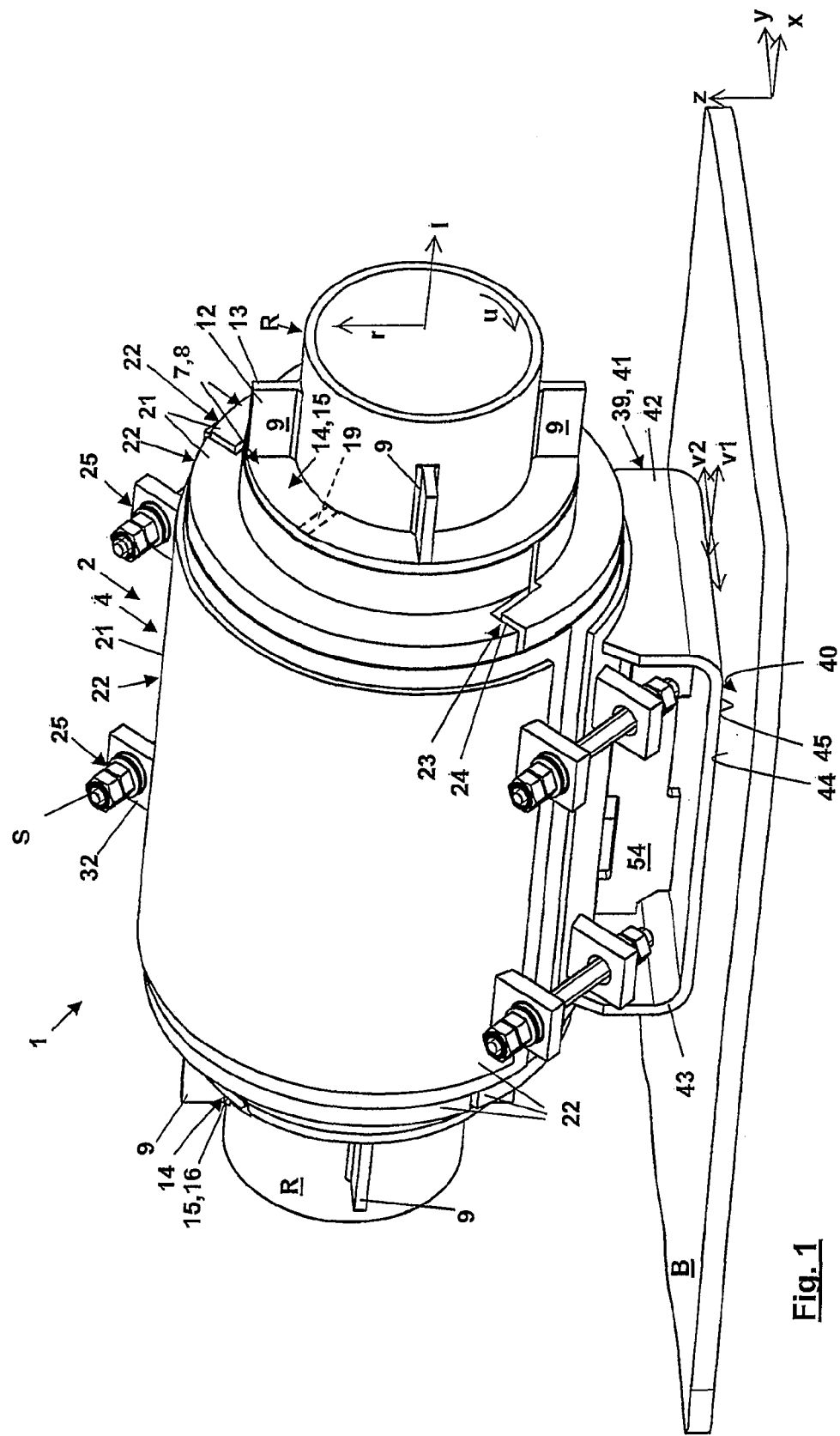

| | | | |
|---|---|---|---|
| 7,213,790 B2 * | 5/2007 | Bailey et al. | 248/65 |
| 7,472,870 B2 * | 1/2009 | Zagorski et al. | 248/65 |
| 7,861,983 B2 | 1/2011 | Lange et al. | |

FOREIGN PATENT DOCUMENTS

| | | |
|---|---|---|
| DE | 102005013728 | 11/2006 |
| JP | 55040207 U | 3/1980 |
| JP | 56049025 Y2 | 11/1981 |
| JP | 58165383 U | 11/1983 |
| JP | 05263971 A | 10/1993 |

OTHER PUBLICATIONS

English language translation of the PCT International Preliminary Report on Patentability received in corresponding PCT Application No. PCT/EP2010/051317.

* cited by examiner

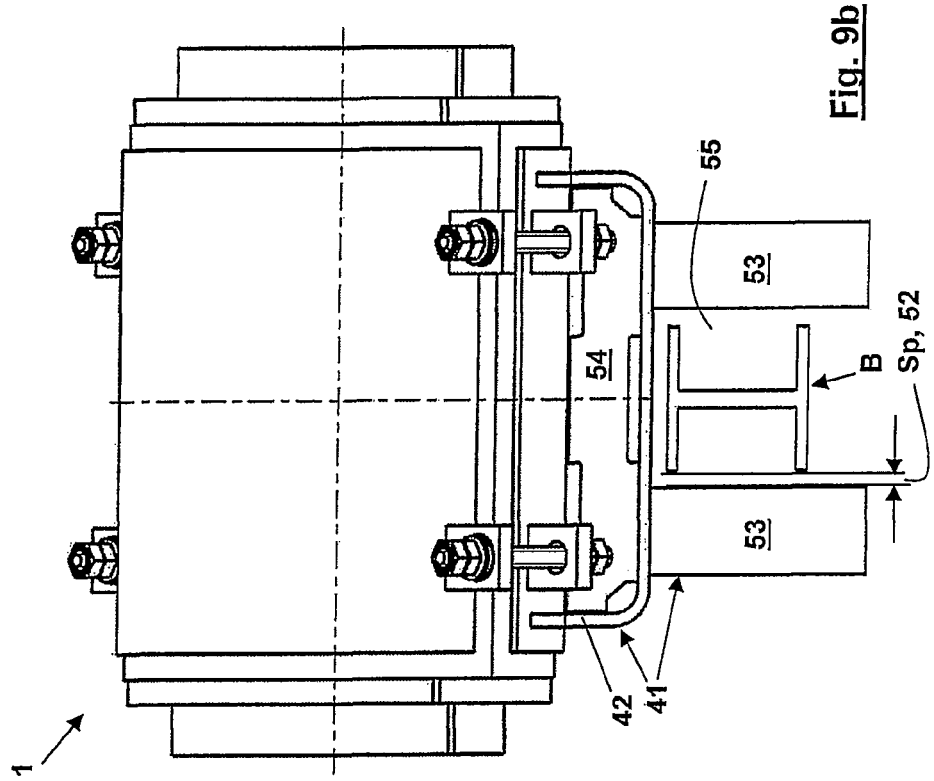
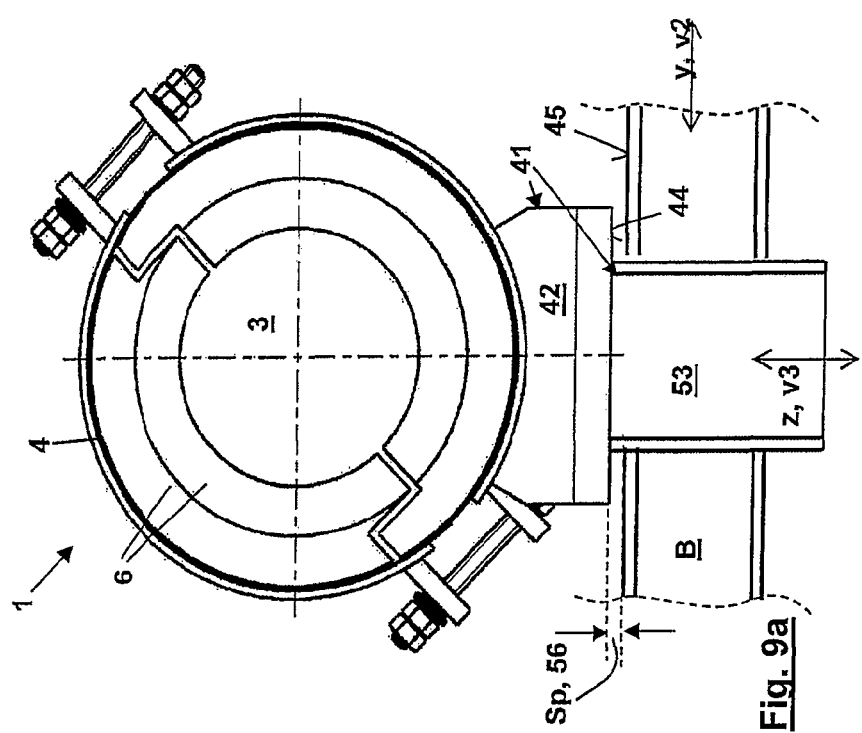
Fig. 9b
Fig. 9a

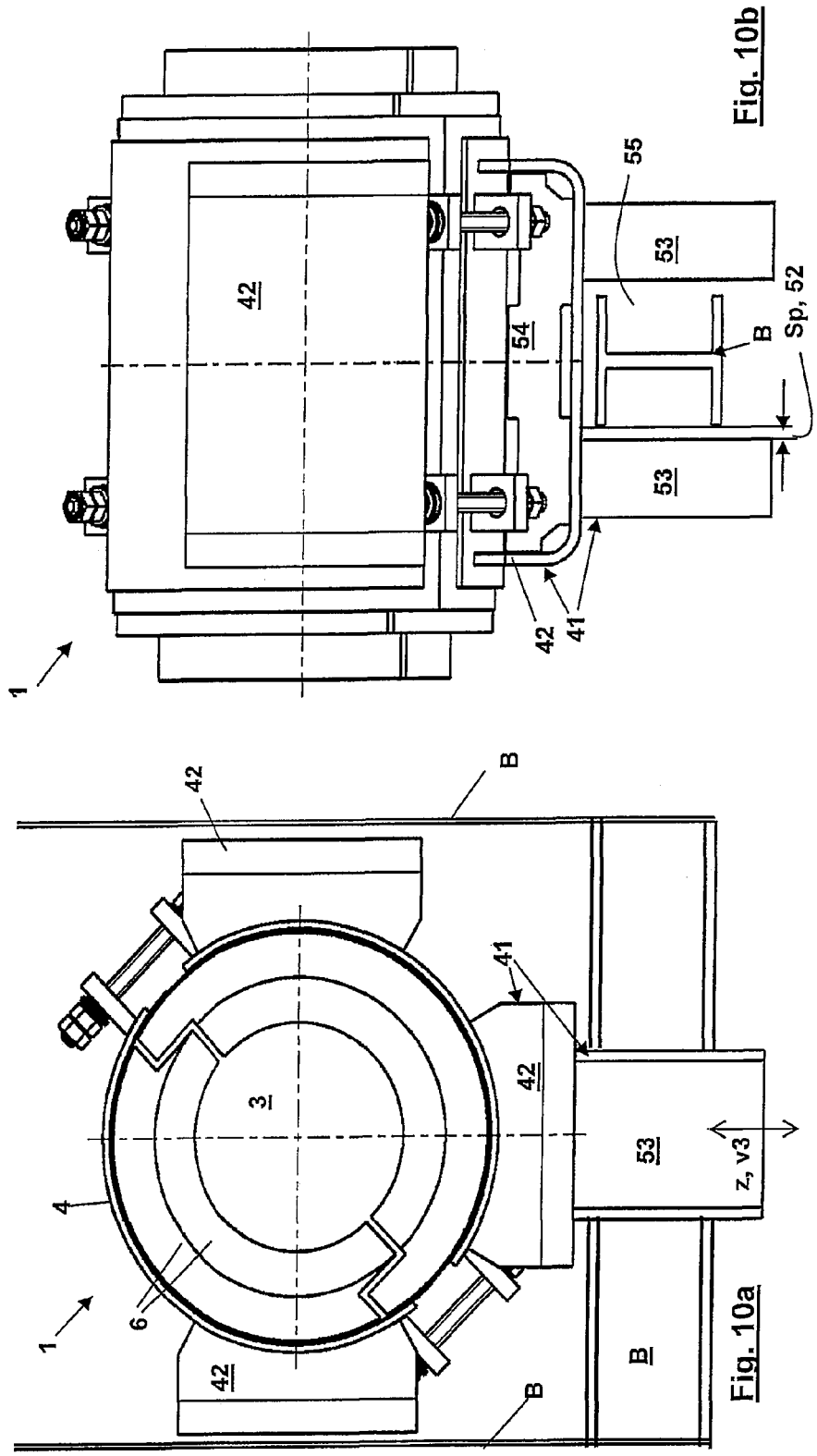

COLD-INSULATED PIPE SUPPORT AND INSTALLATION

The invention concerns a cold-insulated pipe support for a pipeline, in particular for a low-temperature pipeline, comprising a pipe receiving means which delimits a receiving space for a pipe portion of the pipeline and which has an outer shell and an insulating system which is arranged between the outer shell and the receiving space and has a thermal insulation of solid insulating material, and a holding device for receiving and transmitting forces and force moments acting on the pipeline and on a base, wherein the holding device has an abutment device having at least one abutment element for receiving and transmitting axial pipe forces to the pipe receiving means and/or to the base, the abutment element is fixed in the installation position on a narrow-area side surface on the outside on the pipeline, which side surface extends longitudinally in the axial direction in the installation position and is in the form of a connecting side surface, and the at least one abutment element in the installation position engages the pipe receiving means in axially force-operative relationship by way of a provided force application aid. The invention further concerns an installation of the pipe support over the pipeline.

Such pipe supports are used in particular in the field of low-temperature lines. One problem here is fixing the pipe support in a given position on the pipeline and in a relative position with respect to the base.

DE 86 15 502 U1 provides plate-shaped abutment elements which, connected together by way of an annular force application aid, act in axially force-operative relationship on the pipe receiving means, wherein the abutment elements are welded to the pipeline and the force application aid. One solution is described in DE 10 2005 013 728 A1 in which there is provided a relatively complicated and expensive radially inward receiving means for the thermal insulation, which is welded on the pipeline. The inner receiving means is axially divided in half for radially fitting over the pipeline in the installation process. U.S. Pat. No. 4,804,158 proposes welding ring sectors in peripheral relationship on the outside on the pipe portion and in peripheral relationship on the inside on the outer shell so that the pipe receiving means can be held axially. In DE 10 2005 013 728 there is provided a longitudinal division plane for the pipe support, by means of which the pipe support can be moved laterally over the pipeline for installation. All measures suffer from the disadvantage of high mechanical loadings on the pipeline when thermally induced expansion and/or shrinkage of the pipeline occurs.

Therefore the object of the invention is to provide a pipeline of the kind set forth in the opening part of this specification which is of an inexpensive structure and which imposes lower mechanical loading on the pipeline in operation.

According to the invention that object is attained by the features of claim 1. Advantageous developments are set forth in the appendant claims. In particular the specified object is attained in that the force application aid bears against the at least one abutment element in a condition of remaining loose.

The force application aid can be connected to the pipe receiving means and/or the base in force-locking and/or positively locking relationship, in particular by a connection involving intimate joining of the materials concerned. In that way the at least one abutment element can be displaced relative to the force application aid upon thermally induced expansion or contraction of the pipeline, in the radial direction. Possibly, in the radial relative movement as between the force application aid and the abutment element frictional forces opposing that relative movement can occur. As shown hereinafter they can be minimised for example by the provision of play between the pipe receiving means and the base and/or by a given radial spacing of the force application aid relative to the receiving space of the pipe receiving means or, in the installation position, relative to the pipeline.

The abutment element can abut or bear from the outside indirectly or, as shown hereinafter, directly against the pipe receiving means. The abutment element can thus bear against the pipe receiving means in the sense of an abutment at least in relation to the axial direction in positively locking relationship or in a condition of remaining lose. It can thus abut from the exterior directly against the pipe receiving means. For that purpose for installation purposes the abutment element can be guided towards the pipe receiving means which is fitted over the pipeline, bear from the exterior against the pipe receiving means and be fixed to the pipeline. In that way the abutment can bear against the pipe receiving means in a condition of being adapted to the actual position of the pipe receiving means which is mounted on the pipeline. It is proposed that the abutment element be fixed at its narrow connecting side surface to the pipe in such a way that the connecting side surface extends with its larger longitudinal side in the axial direction of the pipeline and with its small narrow side in peripheral relationship on the pipeline. The abutment element is thus fixed with respect to its peripheral extent only in the direction of the narrow side, on the pipeline. By virtue of that orientation of the abutment element on the pipeline the loading of the pipeline can be minimised by the abutment element in respect of a possible change in periphery in the form of expansion and shrinkage as a consequence of changes in temperature which can occur in particular in relation to low-temperature pipelines as a consequence of a high temperature gradient relative to the environment. In respect of a mechanical loading on the abutment element in the axial direction in addition, by virtue of the orientation of the narrow connecting side surface of the abutment element on the pipeline, the mechanical resistance moment can turn out to be correspondingly high which is advantageous as a measurement in respect of strength so that a necessary peripheral extent of the abutment element and therewith the loading of the pipeline as a consequence of the above-mentioned thermally induced changes in periphery can be correspondingly minimised. The abutment element can also or additionally abut or bear against the base, for the transmission of axial pipe forces. That possibility is considered in particular in relation to a low-temperature pipeline but less because of the cold bridge which occurs as a result between the base and the pipeline.

The abutment element can be secured to the pipeline in axially fixed relationship. For that purpose the abutment element can be glued or brazed to the pipeline. Preferably however the abutment element is welded to the pipeline.

A particular advantage is considered to be that at least one abutment element is respectively provided at both sides of the pipe receiving means in relation to the axial direction. In that way the pipe receiving means can be secured on the pipeline in axially fixed relationship. Axial pipe forces can be transmitted in both directions to the pipe receiving means. In that way the pipe support can be secured or fixed on the pipeline by means of the abutment element in situ in exact adaptation to the actual positioning thereof on the pipeline, which respectively occurs in installation of the pipe support. The pipe receiving means can thus be moved over the pipeline at a predetermined location, possibly exactly positioned on the pipeline by means of correcting displacement thereon and then axially fixed by means of the abutment element in an installation position which is then correct. In that way, the pipe support can be correctly installed even in the event of installation deviations, that is to say deviations in respect of the planned position of the pipe support on the pipeline from a position which is then the actual position. It is thus possible for example to avoid additional mechanical stresses which can be caused by the pipe support "bending towards" the pipeline in the event of installation deviations for example towards the position intended in planning and thus being unfavourably braced to the pipeline.

The abutment element or elements can bear against the pipe receiving means in force-locking and/or positively locking relationship directly with a side surface or indirectly by way of force application aids or the like to reduce a pressure generated by the transmitted pipe forces on the pipe receiving means. For direct transmission of axial pipe forces to the pipe receiving means the abutment element can be for example of a wedge-like configuration having a flattened wedge tip as a connecting side surface and a trapezoidal end face, by means of which the abutment element can bear axially against the pipe receiving means in the installation position. Thus the trapezoidal end face can be substantially larger than the flattened wedge tip so that the pressure exerted as a consequence of the application of force on the pipe receiving means can be correspondingly low. The abutment element or elements can act in a condition of remaining loose axially indirectly or directly at the pipe receiving means and/or the base. As a consequence of the transmission of force, frictional forces can occur, which permit the transmission of peripherally acting forces.

In a preferred embodiment of the pipe support the abutment element is of a plate-shaped configuration with large side surfaces and narrow side surfaces connecting same, wherein a narrow side surface can form the connecting side surface for fixing the abutment element to the pipeline. In addition in the installation position the abutment element can act axially on the pipe receiving means by way of a force application aid. For that purpose the abutment element can act on the force application aid with a narrow side surface in the form of an abutment side surface. The force application aid can be for example in the form of a preferably plate-shaped component which is arranged at the end of the abutment element and which preferably extends at least partially peripherally, having large side surfaces and narrow side surfaces. The plate-shaped component can be arranged peripherally in the installation position and can preferably be fixed centrally in relation to the abutment element on one of its large side surfaces to the abutment element. The plate-shaped component can act axially laterally at the pipe receiving means by means of its other large side surface which extends in the cross-sectional plane in the installation position and which is towards the pipe receiving means. Thus, by means of the force application aid, pipe forces can be applied laterally to the pipe receiving means over a larger side surface than the narrow side surface of the abutment element and thus with a lower level of pressure loading for the pipe receiving means.

The force application aid can be for example connected in force-locking and/or positively locking relationship to at least one abutment element. In that case the force application aid can act on the pipe receiving means and/or the base in a condition of remaining loose. Preferably however the pipe application aid bears against the at least one abutment element in a condition of remaining loose.

The force application aid can be in the form of a ring element which is at least partially peripherally arranged in the installation position, in particular in the form of a ring segment, with a side surface which extends in the cross-sectional plane in the installation position and which is towards the pipe receiving means and which axially laterally engages the pipe receiving means. The ring element can be fixed to the abutment side surface of the associated abutment element thereon.

In particular the force application aid can be in the form of a circular ring disc, in particular a circular ring segment, having an inside radius. The circular ring disc can thus have a first circular ring side surface which in the installation position is towards the abutment element and a second circular ring side surface which is towards the pipe receiving means and which axially laterally acts on the pipe receiving means. A ring segment or a circular ring segment can be associated with each abutment element.

Preferably the force application aid is arranged in radially spaced relationship with the pipeline. That can prevent direct heat transfer by means of thermal conduction from the force application aid to the pipeline. Thus in the installation position only the abutment element acts with its narrow side surface in a relationship of transmitting heat to the pipeline as a result of thermal conduction. In an advantageous fashion from the point of view of mechanical forces involved, the radial spacing of the force application aid with respect to the pipeline can be between about 0.5 mm and 5 mm. Preferably the spacing, that is to say the intermediate space which is formed by the spacing of the force application aid relative to the pipeline, is filled with insulation. That insulation can stabilise the radial position of the force application aid.

In a preferred development of the pipe support the ring element or the circular ring disc can be fixed radially and axially with respect to the support receiving means in positively locking and/or force-locking relationship to the thermal insulation. Preferably in the installation position the ring element bears against the thermal insulation in a condition of remaining loose, at least with respect to the axial direction. At least two abutment elements which are preferably equally spaced over the periphery of the pipeline in the installation position can engage the ring element at the end and preferably in a condition of remaining loose, with respect to the ring element. Thus the ring element cannot impede thermally induced expansion or shrinkage of the pipe portion and accordingly cannot produce any additional stresses in the pipeline. In addition that advantageously restricts transfer of heat from the force application aid or the ring element to the abutment element or elements. As a consequence of the frictional conditions occurring between the abutment elements and the ring element, with a peripherally acting loading, certain peripheral forces can be transmitted between the abutment elements and the ring element.

The abutment elements are preferably arranged at equal mutual spacings over the periphery. Therefore two abutment elements can be arranged at a centre point angle of 180°, three abutment elements at a centre point angle of 120° and, which is preferred, four abutment elements at a centre point angle of 90° spacing from each other.

Preferably the ring element is made up of at least two ring sectors, in particular circular ring sectors. For installation of the pipe support over the pipeline they can be moved radially from the outside over the pipeline and can preferably be connected together with a connection involving intimate joining of the materials concerned to afford a fully peripheral ring or fully peripheral circular ring. Preferably the ring sectors or circular ring sectors are welded together in the installation position over the pipeline. Desirably, for the welding operation, a corresponding seam preparation can be provided in the form of bevels at side surfaces, facing in the peripheral direction, of the ring sectors or circular ring sectors, which make it possible to produce a V-shaped welded seam or a double-V-shaped seam. After the weld has been made a projecting portion of the welded seam extending beyond the side surfaces of the ring element or circular ring which is then complete can be removed in the usual manner, preferably being ground off to the surface. That is desirably effected before the ring element or circular ring laterally bears against the pipe receiving means.

Preferably the insulating system has further insulating material arranged in an intermediate space between the pipeline and the force application aid which is spaced radially from the pipeline. Preferably the insulating system is provided with further components such as a cryogenic vapour barrier preferably of elastomer mastic at least at the surfaces that face outwardly in the installation position of the thermal insulation for sealing thereof. The outwardly facing surface of the thermal insulation can be sealed with a laminated aluminium/polyester film. For that purpose the aluminium/polyester film can preferably be glued to the surface. Preferably at least the outwardly facing surfaces of the thermal insulation are of a fire-retardant nature.

The holding device can have at least one carrier structure for supporting and/or suspending the pipe support on the base. By virtue of the carrier structure the pipe support can be mounted to the base in slidingly displaceable and/or rollingly displaceable relationship within a first displacement region in an axially first displacement direction, within a second displacement region in a tangential second displacement direction perpendicular to the first displacement direction and/or within a third displacement region in a radial third displacement direction perpendicular to the first and second displacement directions. By virtue of the displaceable mounting of the pipe support the pipeline can expand and contract unimpededly under the effect of heat so that it is subjected to a lesser loading, while however the pipe support retains a supporting effect. Advantageously at least one of the displacement regions can be delimited at its ends by means of abutments.

The pipe support can thus be mounted to the base in rollingly displaceable relationship for example by way of rollers, balls and the like and/or preferably in slidingly displaceable relationship by way of a surface in the form of a first sliding surface. Accordingly the pipe support can be supported or suspended by means of the holding device in a support with at least one degree of freedom. The pipe support can be moved in the axial direction for example relative to the base in order for example to allow a change in length of the pipeline fitted in the pipe receiving means. In the case of for example a curved pipeline configuration, a change in length of the pipeline can occur in a plane so that here the pipe support can be mounted movably preferably parallel to that plane and thus involving two degrees of freedom. If the movement of the pipe support occurs relative to the base in the form of a rolling movement then the holding device can for example have a preferably twin-axis rolling carriage with rolling bodies. In the case of a linear movement the rolling bodies can be in the form of rollers while in the case of a movement in the surface they can be in the form of freely rotatable balls.

The carrier structure can have a foot element which is preferably connected fixedly to the pipe receiving means and preferably here on the outside to the outer shell. The foot element can extend radially from the pipe receiving means. It can have the radially outwardly disposed first sliding surface for slidingly displaceable mounting to the base, wherein a second sliding surface can be provided on the base as a support means, against which the foot can slide with its first sliding surface. In the installation position therefore the foot element and therewith the pipe support can be supported on the base in slidingly displaceable relationship in the first displacement region and/or the second displacement region. At least one of the sliding surfaces can be particularly capable of sliding movement. For that purpose for example a friction-reducing coating can be provided, in particular of polytetrafluoroethylene (PTFE). Preferably the second sliding surface has at least one PTFE pad which can be fixed in positively locking relationship in a recess in the second sliding surface. Preferably the PTFE pad is glued in the sliding surface. In a preferred material pairing with respect to the PTFE coating on the one sliding surface, there is a preferably plate-like coating on the other sliding surface, using a stainless high-quality steel.

The abutments can desirably be in the form of angle profiles with a side surface which in the installation position is arranged perpendicularly to the respectively associated displacement direction and which is in the form of an abutment surface. The angle profiles can be respectively secured to the base. Preferably at least one of the displacement regions is adjustable. For that purpose the abutments can be arranged displaceably in a linear guide in the respectively associated displacement direction over a displacement travel and can be fixed in the guide or to the base in a given position over the displacement travel. Thus the respectively associated displacement region can be set or altered by way of displacement of the position of an abutment in the associated displacement direction. The linear guide can have for example two longitudinal holes which are in mutually parallel spaced relationship and which extend in the associated displacement direction and in which the respective abutment can be guided and fixed by means of provided screw bolts.

The thermal insulation can be fixed on the pipeline or the pipe portion in the installation position. Preferably the thermal insulation is glued to the pipeline. A two-component or multi-component adhesive can be used for gluing purposes. So that no unwanted relative movement can occur between the pipe receiving means and the pipe portion in the pipe receiving means in the installation position, it is essential that the frictional forces which occur in the movement, that is to say essentially the static friction as well as the sliding friction and/or rolling friction in the mounting of the foot, are less than the frictional and/or adhesion forces between the thermal insulation and the pipe portion. Therefore the co-operating sliding surfaces of the carrier structure and the base can be provided with friction-reducing measures such as a smooth surface, lubrication or a coating with a low-friction layer material.

For easier mounting thereof the outer shell and the thermal insulation can each have at least one shape division, involving a division perpendicularly to the cross-sectional plane of the pipe receiving means. Thus, by means of the division in shape, the outer shell and the thermal insulation can be divided into shaped portions which can be moved over the pipeline in a radial installation direction for mounting the pipe support on the pipeline, and can be assembled together again. In that case the shape division is desirably such that the shaped portions do not involve any undercut configurations in relation to a radial direction or perpendicularly to the longitudinal axis so that the shaped portions can be moved apart and moved over each other without any problem. In particular the outer shell can be of such a dimension that the shaped portions in the form of half-shell portions are spaced by way of a gap in their assembled position and the gap can be bridged over by means of preferably screw connections to connect the half-shell portions in the peripheral direction. In that way the half-shell portions can be connected together in a prestressed condition. By means of the prestressing the shaped portions of the thermal insulation can be pressed against each other and against the pipe portion. Preferably the shaped portions of the thermal insulation which can also be in the form of half-shell portions when the thermal insulation is divided into two bear against each other in their assembled position over a preferably narrow gap. That gap can be filled with additional, preferably elastically deformable insulating material. The division of the thermal insulation can be of a stepped configuration with respect to the radial extent. That per se known measure serves predominantly to avoid a purely radial gap between the shaped portions of the thermal insulation in the installation position on the pipeline. In regard to the possible division of the pipe receiving means, that is to say here the thermal insulation and the outer shell, as well as radial installation thereof, attention is directed in other respects to DE 10 2005 013 728 A1, the disclosure of which in respect of the division in shape and radial installation of the pipe receiving means as well as in respect of the additional thermal insulation measures is incorporated into this application as those measures can also advantageously be applied in relation to the subject-matter of this application.

The holding device can further have clamping elements for holding together and for bracing the shaped portions of the outer shell and/or the thermal insulation in the installation position and pressing them on the pipeline. The holding device can have for example peripheral bands which are placed over the outside of the outer shell and tightened. Preferably however the holding device has a screw connection which connects together the shaped portions of the outer shell and therewith the thermal insulation or insulating system connected to the outer shell in positively locking and force-locking relationship, in the peripheral direction, and preferably additionally braces them by means of a prestressing device. The prestressing device can have spring elements in the screw connection. That makes it possible to provide that the change in the prestressing is minimised upon a change in dimension, in particular as a consequence of changes in temperature.

The latter measure permits a fit that is firmer, that is to say more resistant to displacement and rotation, in respect of the pipeline or the pipe portion in the support receiving means. The screw connection can have projections which are fixed at the outside and near the plane of division of the outer shell and which preferably extend perpendicularly to the direction of the maximum force to be expected and thus here approximately parallel to the plane of division radially outwardly in such a way that they are disposed in opposite paired relationship. The projections can have a screw opening in the peripheral direction, through which screws or screw bolts are passed and screwed for connecting the respective projections in paired opposite relationship. In that case there can be provided an additional lock nut and/or a securing washer for securing the screw connection. The screw connection can be additionally prestressed by way of the spring device.

The spring device can have plate springs which are preferably arranged between the screw head and the side surface of the projection, that is adjacent to the screw head. That also makes it possible to ensure that the screw connection holds the shaped portions together with tensile forces which remain approximately the same and thus presses them against the pipe portion under a pressing force that remains approximately the same. As is known the plate springs can be arranged on the screw bolt in mutually aligned relationship and in an alternating succession and thus "connected in series" and/or in the same succession and thus "connected in parallel". As is known the alternating succession can provide an increase in a spring travel and the same succession can provide an increase in a spring force of the spring device. Insofar as the screw openings and the inside diameter of the plate springs are somewhat larger than the outside diameter of the associated screw, the plate springs, when they are firmly tightened, can be centred by virtue of their conical shape into the through openings. Instead of or in addition to plate springs it can be provided that a tension spring which extends over the gap tightens the half-shell portions of the shaped portions together, in which case the tension spring can also be held by projections the same as those of the above-mentioned screw connection.

Preferably the outer shell and/or thermal insulation are of a mirror-image configuration with respect to a central first plane of mirror symmetry in the longitudinal sectional plane and/or a central second plane of mirror symmetry preferably in the cross-sectional plane. In addition the axial extent of the outer shell can be less than that of the thermal insulation.

For easier positioning of the outer shell and the thermal insulation in the assembly procedure in relation to their relative axial position there can be provided an at least partially peripheral ring disc, in particular at least one internal ring sector, which is fixed in spaced relationship with axial end regions of the outer shell and at the inside to the outer shell and which in the installation position extends radially inwardly in positively locking and/or force-locking relationship into the thermal insulation. That ring disc or the internal ring sector can be fixed in the form of ring half-shell portions to the outer shell at the inside thereof.

By virtue of its structure according to the invention the installation of the pipe support can be considerably simplified and can be mounted on the pipeline while avoiding additional stresses acting thereon. For that purpose the pipe support can be designed in accordance with one of the above-described embodiments and in particular can have the features that it has a pipe receiving means which delimits a receiving space for a pipe portion of the supportable pipeline and has an outer shell, an insulating system arranged between the outer shell and having a thermal insulation comprising solid insulating material and a holding device for receiving and transmitting pipe forces and moments acting on the pipeline and on a base, the holding device has an abutment device having at least one abutment element at least for receiving and transmitting axial pipe forces to the pipe receiving means and the outer shell and the thermal insulation each have at least one shape division with a division perpendicularly to the cross-sectional plane of the pipe receiving means. The following steps can be provided for installing the pipe support:

moving the shaped portions of the pipe receiving means, that are formed by the division in shape, radially over the pipeline into an installation position, wherein during same and/or subsequently axial orientation thereof on the pipeline can be effected, positioning and fixing at least one respective abutment element at both sides of the pipe receiving means, with respect to the axial direction, at a narrow-area side surface which extends longitudinally in the axial direction of the pipeline in the installation position and which is in the form of a connecting side surface to the pipeline on the outside, so that the abutment element bears indirectly by way of a force application aid or directly in force-locking and/or positively locking relationship in the axial direction against the pipe receiving means, wherein the force application aid bears against the abutment element in a condition of remaining loose, and fixing the shaped portions on the pipeline in a relative position with respect to each other.

Axial orientation can be effected to correct the axial position of the pipe receiving means on the pipeline, in order for example to take account for example of a deviation in a planned position of the pipe receiving means from the position which actually occurs in the course of constructing the pipeline, in respect of the pipe receiving means on the pipeline. Fixing the shaped portions on the pipeline can also be effected prior to fixing the abutment elements. As described hereinbefore the force application aid can be in the form of a circular ring disc which is divided into at least two circular ring sectors for radial fitment. The circular ring sectors can be moved radially over the pipeline prior to, with or after fitment of the pipe support over the pipe portion, and assembled together to form the circular ring disc, in particular by welding. Thus the welding operation to provide the circular ring disc can be effected axially remote from the pipe receiving means, whereby it is possible to completely avoid thermal stressing of the pipe receiving means as a consequence of the welding procedure. A respective circular ring disc can be provided on both sides of the pipe support with respect to the axial direction.

The circular ring disc can have an inside radius which is greater than the outside diameter of the pipe portion, and a first circular ring side surface that is towards the abutment element in the installation position and a second circular ring side surface that is towards the pipe receiving means in the installation position and preferably directly bears axially laterally thereagainst. For assembly purposes the assembled circular ring disc can be positioned coaxially with respect to the pipe portion and can be positioned axially at the end at the thermal insulation at its second circular ring side surface for bearing preferably lightly in force-locking and/or positively locking relationship or for bearing in a condition of remaining loose. Then the abutment elements can be guided axially towards the first circular ring surface and fixed to the pipeline, in which case they can bear in a condition of remaining loose against the associated abutment element.

In addition the holding device can have at least one carrier structure for supporting and/or suspending the pipe support on the base. The carrier structure can be moved to the base prior to, with or after fitment of the pipe support on the outside for supporting the pipe support in force-locking and/or positively locking relationship and/or for suspension of the pipe support in force-locking and/or positively locking relationship. For that purpose the carrier structure can be adapted to a base which is provided locally and/or the base of the carrier structure, by the base being built up for example towards the pipe support. That is simplified if the base is for example in the form of a relatively easily modifiable steel framework structure.

Figure 2A:
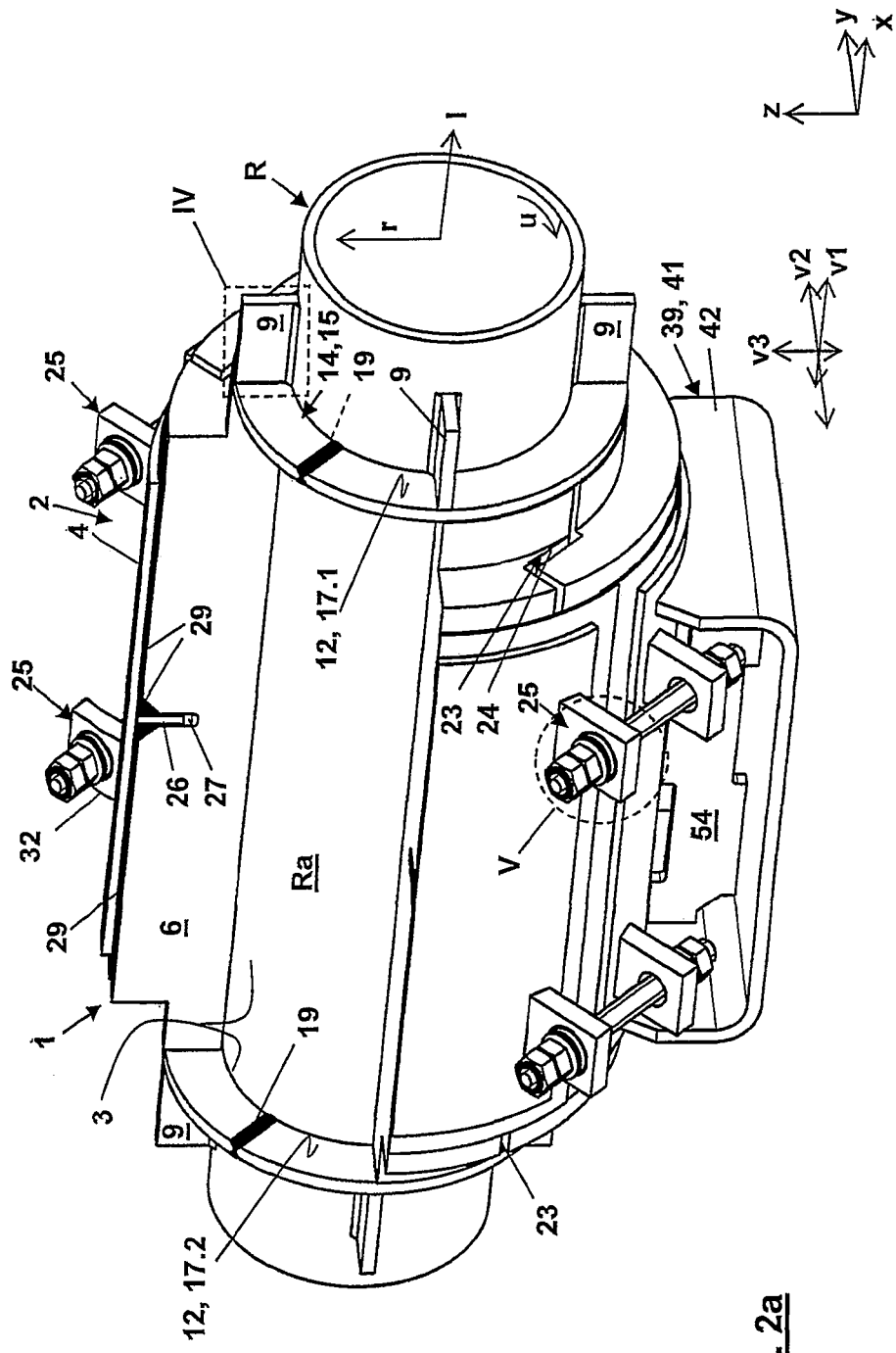
Figure 2B:
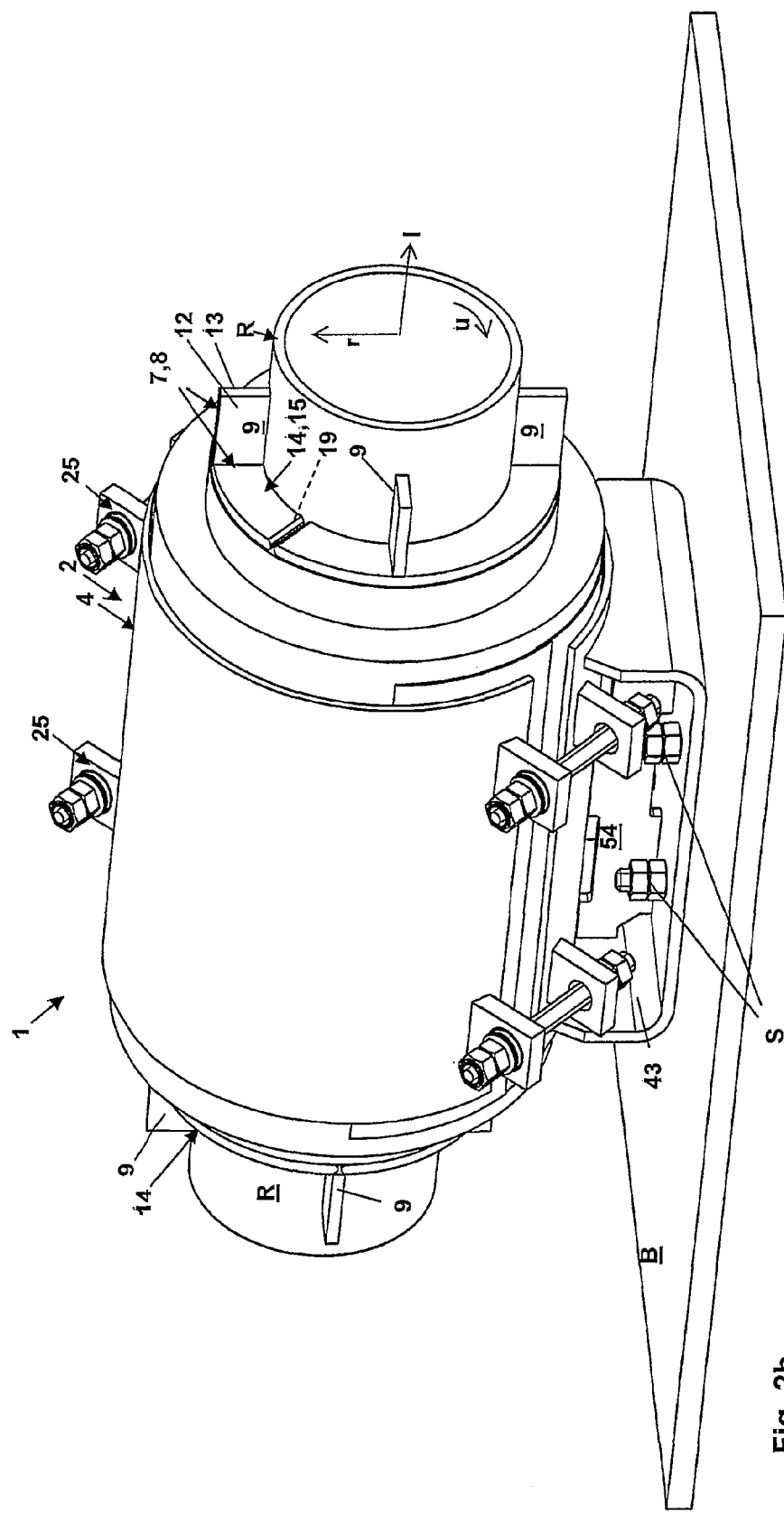
Figure 3:
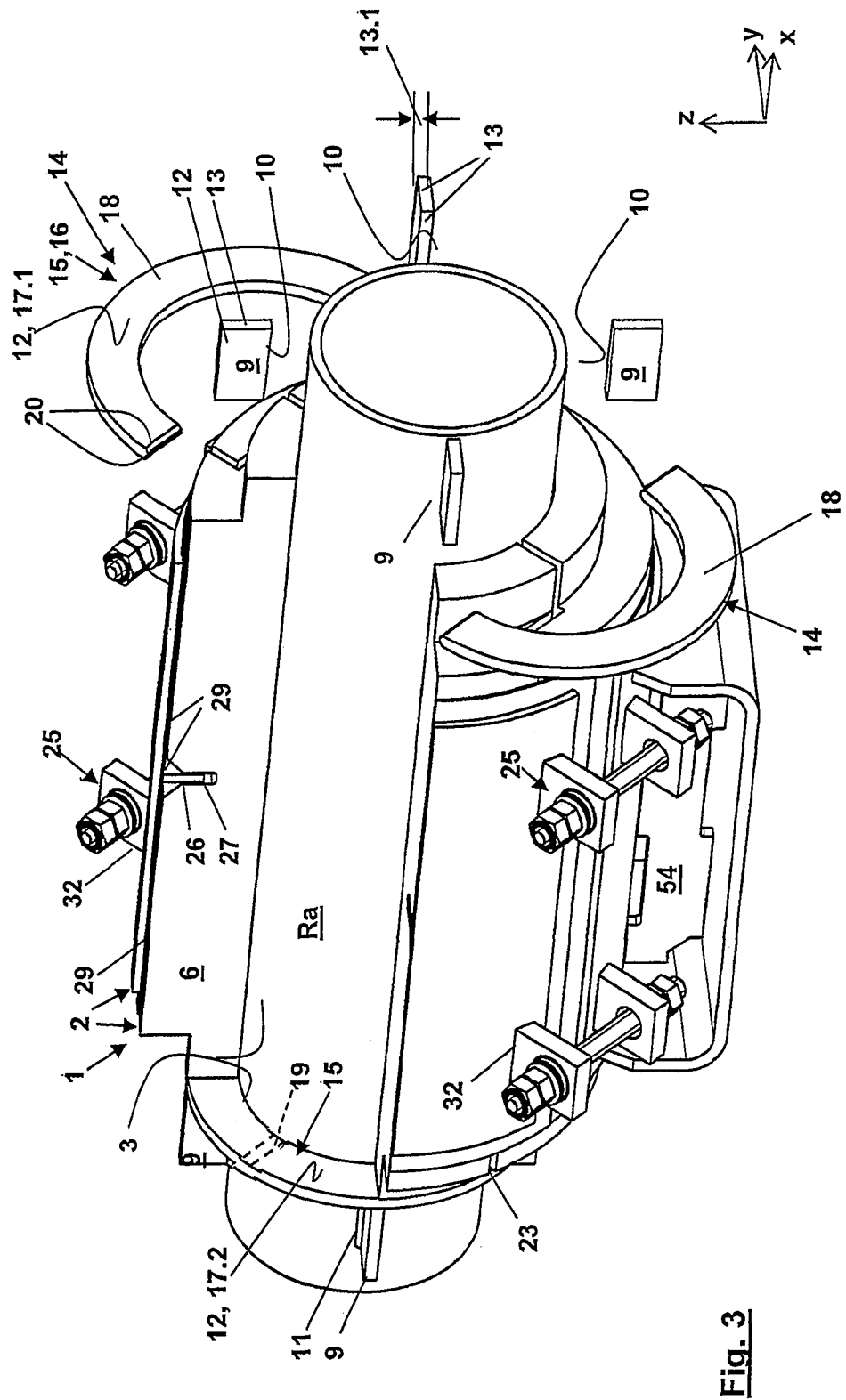
Figure 5:
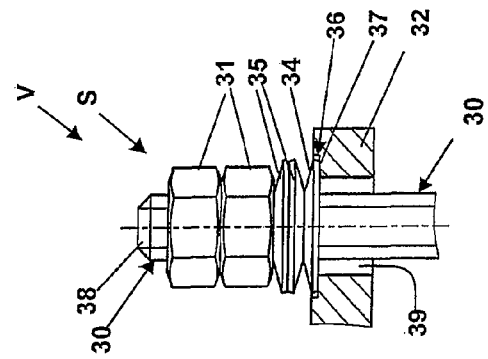
Figure 4A:
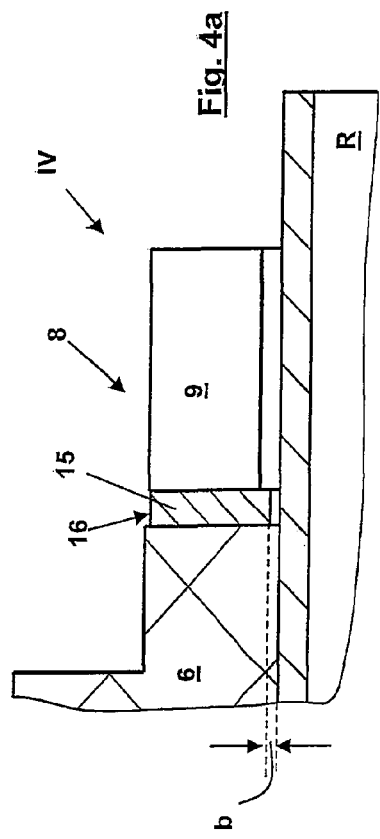
Figure 4B:
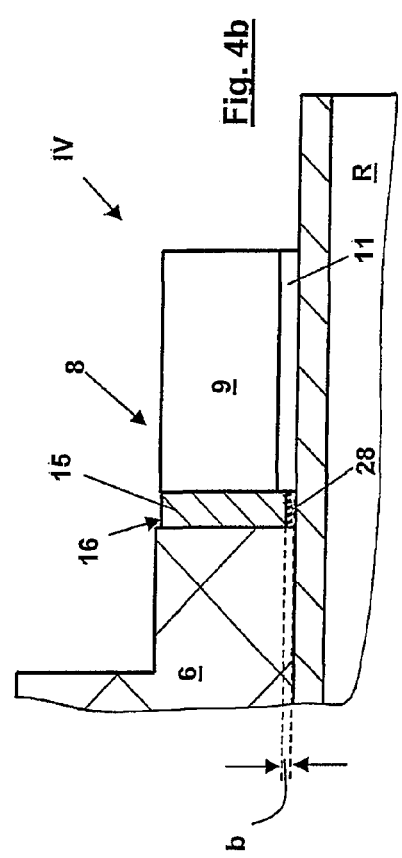
Figure 6:
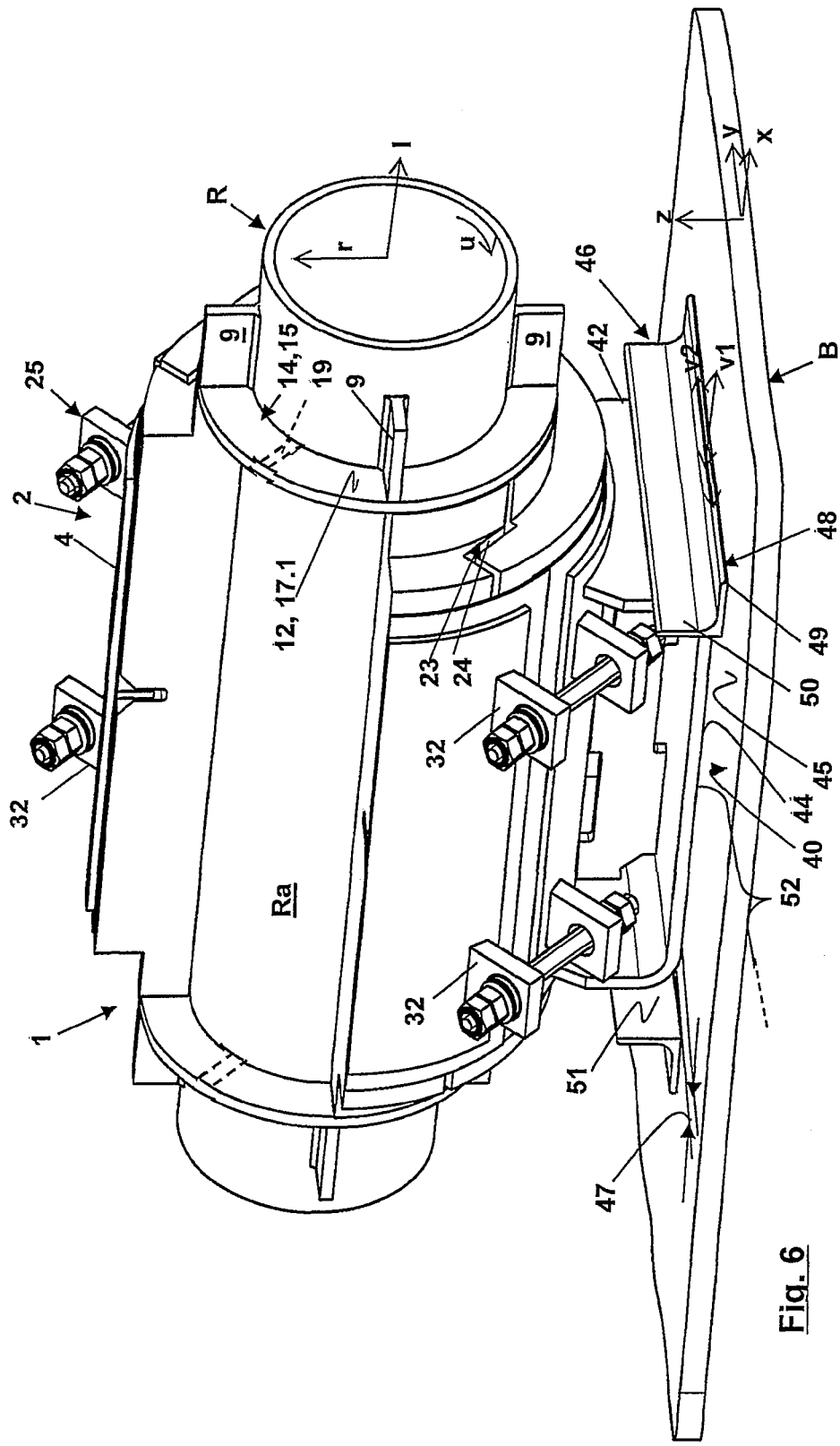
Figure 7:
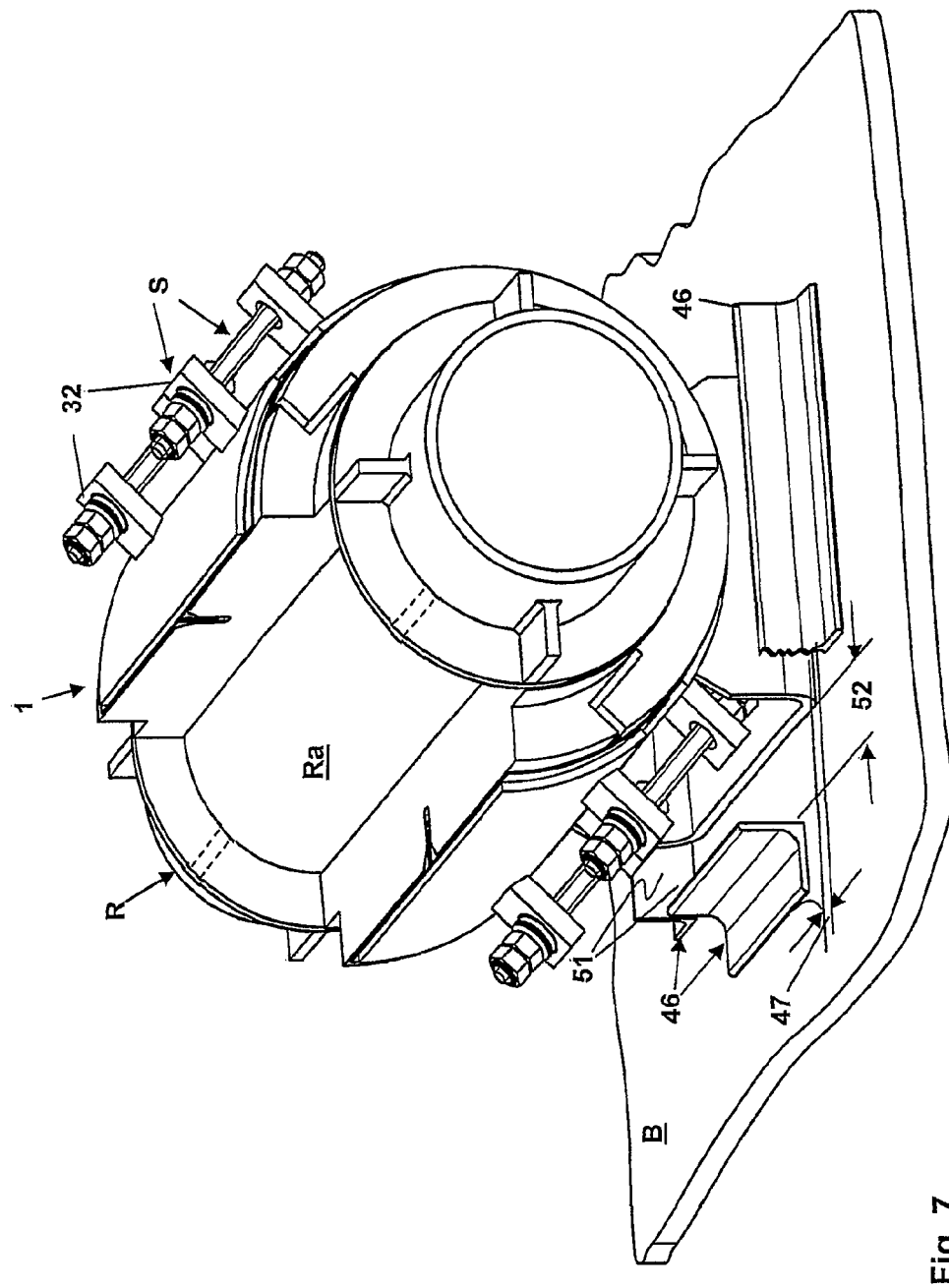
Figure 8:
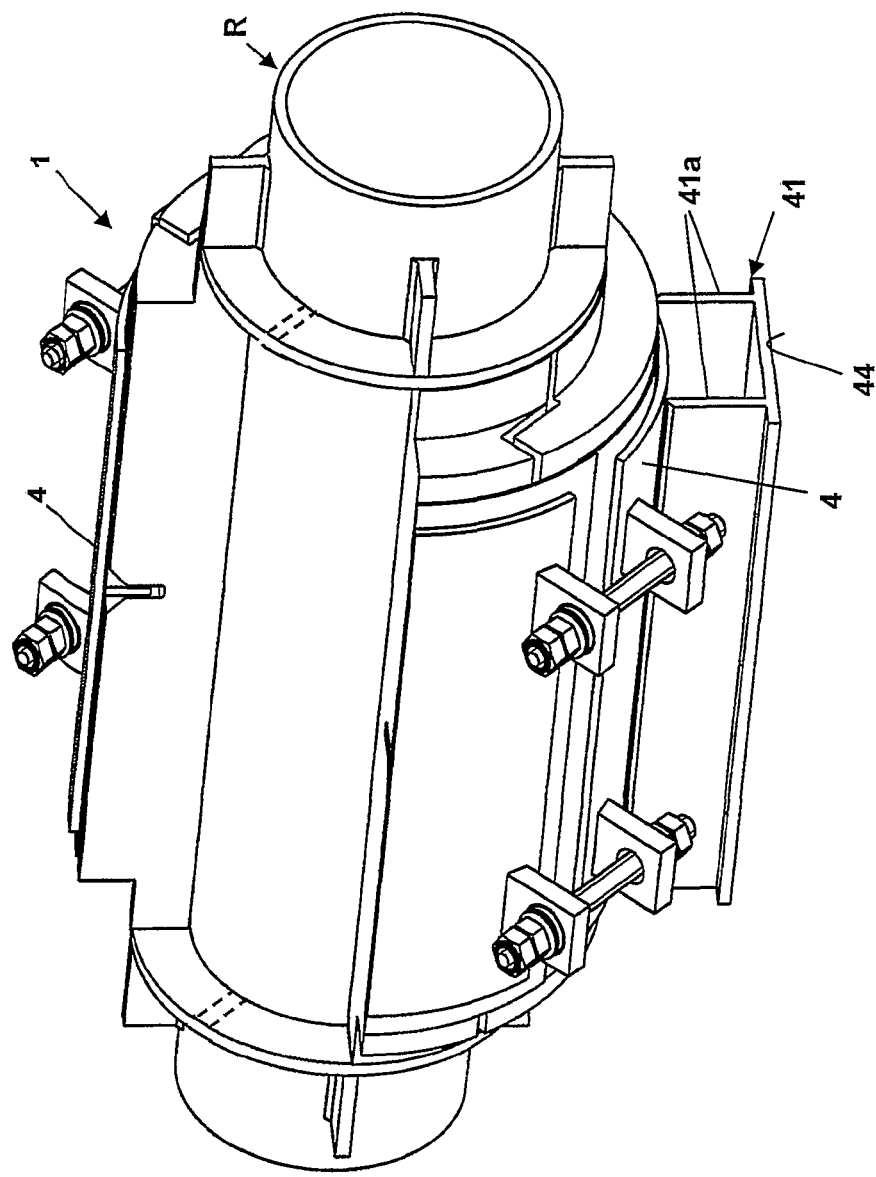
Figure 11C:
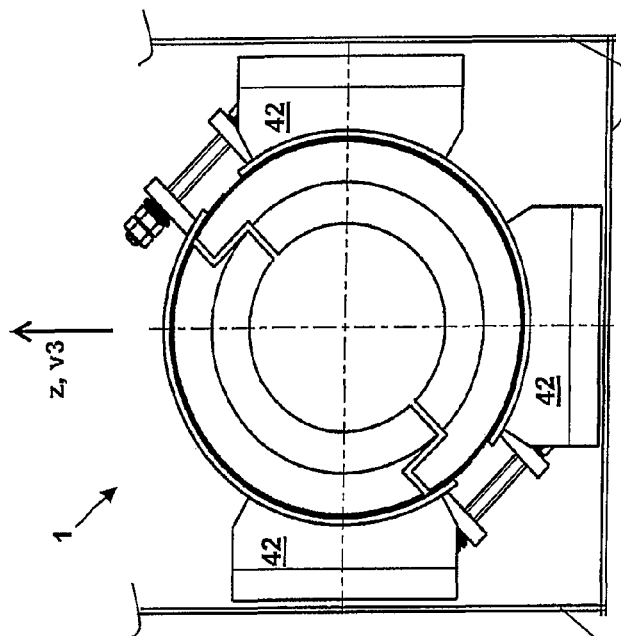
Figure 11B:
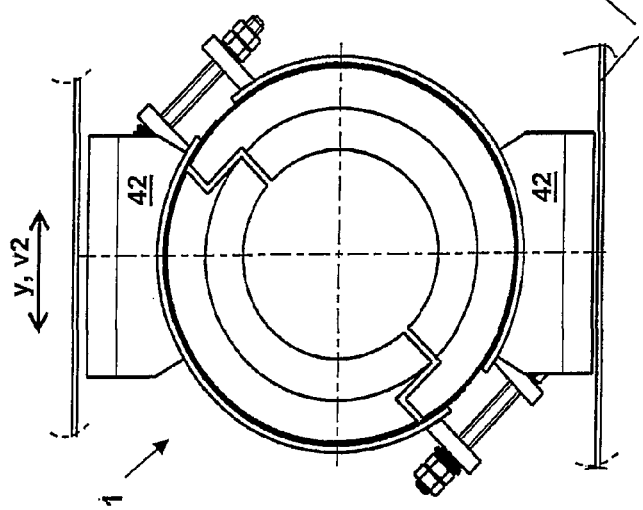
Figure 11A:
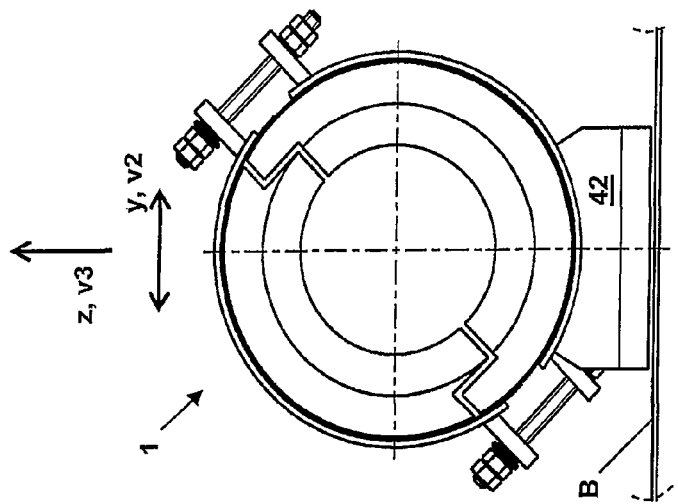
Figure 12:
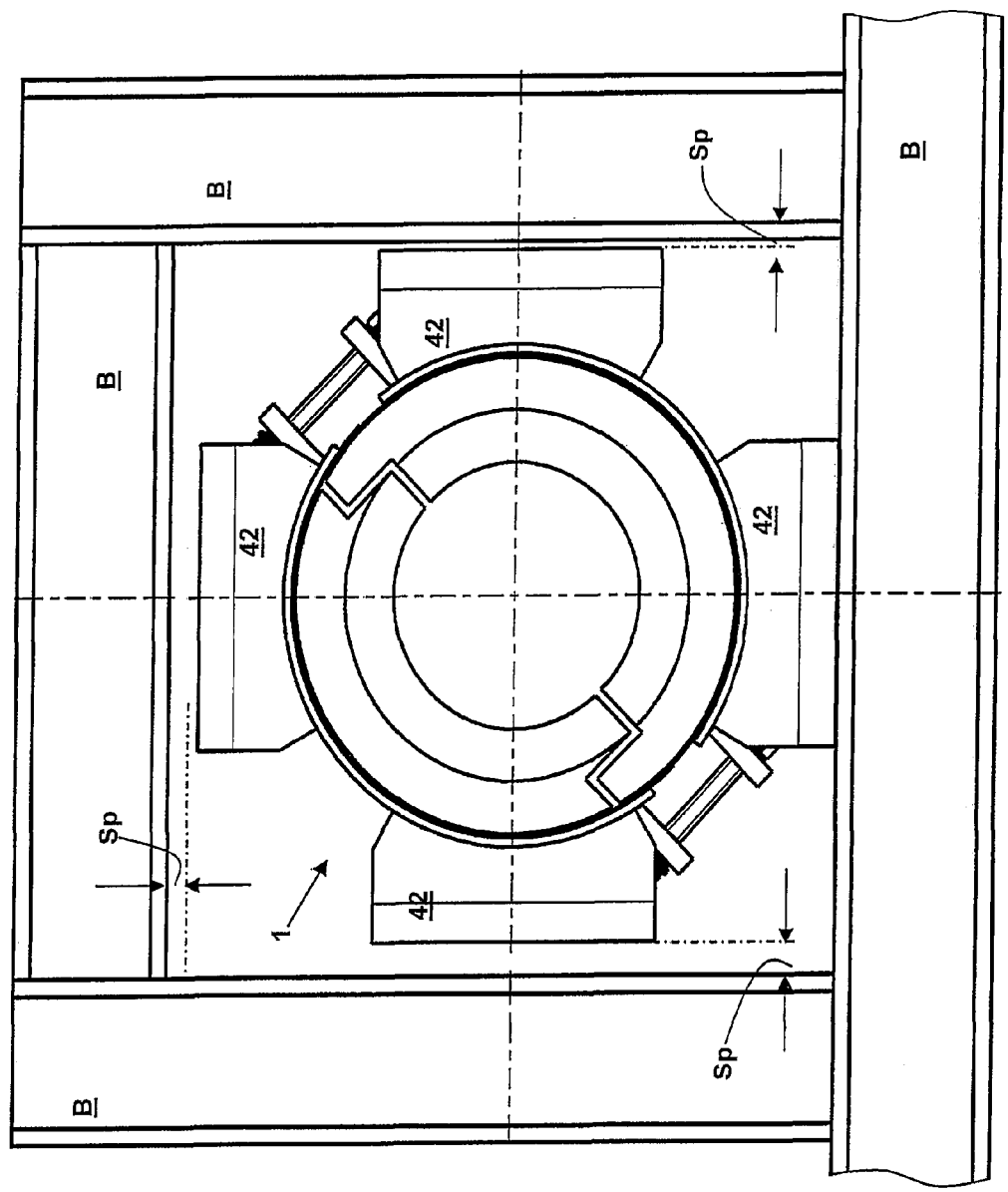

The present invention is described in greater detail hereinafter by means of a number of embodiments by way of example illustrated in a drawing in which:

FIG. 1 shows a perspective side view of a first embodiment of a cold-insulated pipe support with pipeline and on a base, FIG. 2a shows a perspective side view of the first embodiment of the pipe support of FIG. 1, wherein a region of a thermal insulation is omitted, with a foot in the form of a slider, FIG. 2b shows a perspective side view of the embodiment of the pipe support of FIG. 2a, wherein in this case the pipe support is fixed to the base, FIG. 3 shows a perspective side view of FIG. 2a, showing a part of a holding device of the pipe support in the form of an exploded view, FIGS. 4a and 4b each show a sectional view of a portion IV in FIG. 2a, FIG. 5 shows a sectional view of a portion V in FIG. 2a, FIG. 6 shows a perspective side view of a further embodiment of the pipe support with pipeline and on the base, FIG. 7 shows a perspective plan view of a further embodiment of the pipe support with pipeline and on the base, FIG. 8 shows a perspective side view similarly to the embodiment of the pipe support in FIG. 2, but with a base in the form of a rectangular-U-shaped profile, FIGS. 9a and 9b show two side views of a further embodiment of the pipe support on the base, without abutment device and without pipeline, FIGS. 10a and 10b show two side views of a further embodiment of the pipe support on the base, without abutment device and without pipeline, FIGS. 11a to 11c each show a side view of a further embodiment of the pipe support on the base, without abutment device and without pipeline, and FIG. 12 shows a side view of a further embodiment of the pipe support on the base, without abutment device and without pipeline.

FIGS. 1 to 12 show various views and partial views of a number of embodiments of a cold-insulated pipe support 1 for a pipeline R which here is in the form of a low-temperature pipeline. The pipe support 1 includes a pipe receiving means 2 delimiting a receiving space 3 for a pipe portion Ra of the pipeline R. The pipe receiving means 2 has an outer shell 4 and an insulating system 5 which is arranged between the outer shell 4 and the receiving space 3 and which has a thermal insulation 6 of solid insulating material. The pipe support 1 further includes a holding device 7 for receiving and transmitting forces and force moments acting on the pipeline R and on a base B. The holding device 7 has an abutment device 8 with abutment elements 9 for receiving and transmitting axial pipe forces to the pipe receiving means 2 and/or the base B. As shown for example in FIG. 1 the abutment elements 9 in an installation position are welded on the outside to the pipeline R at a narrow-area side surface which extends longitudinally in the axial direction x in the installation position and which are in the form of a connecting side surface 10, this being implemented here by means of fillet weld seams 11. As can be clearly seen from the drawing the abutment elements 9 are each of a plate-shaped configuration with large side surfaces 12 and narrow side surfaces 13 connecting the large side surfaces 12, one of the narrow side surfaces 13 forming the connecting side surface 10. The respective narrow sides 13.1 of the narrow side surfaces 13 thus extend in the peripheral direction u. The narrow side surfaces 13 and here also the abutment elements 9 extend in respect of their longitudinal direction l in the axial direction x. Thus a peripheral, thermally induced change in the pipeline is only slightly impeded by the abutment elements welded thereon so that here no incompatible pipe stresses can occur.

Provided on each of the two sides of the pipe receiving means 2 are four abutment elements 9 which are equally spaced in the peripheral direction u and which respectively engage a force application aid 14 with a narrow side surface 13. The force application aid 14 in the embodiments of the pipe support 1 shown here is in the form of a ring element 16 which here is in the form of a circular ring disc 15. Here it bears with a first circular ring side surface 17.1 directly against the narrow side surface 13 on the associated abutment elements 9 and here axially with a second circular ring side surface 17.2 directly against the thermal insulation 6 of solid insulating material. Thus the forces which are applied by way of the narrow side surface 13 of the abutment elements 9, that bears against the circular ring disc 15, are applied over a large area and thus under a low pressure to the thermal insulation 6 and the pipe receiving means 2 so that for the application of force there is no need for any further reinforcement of the thermal insulation.

A further substantial advantage of the pipe support 1 according to the invention will be clear in particular from the view in FIG. 3, a perspective side view of the pipe support 1, wherein in FIG. 3 the part which here is at the right of the holding device 7 is shown in the form of an exploded view while a peripheral part of the pipe receiving means 2 has been removed for greater ease of understanding:

Here the circular ring disc 17 comprises two ring sectors 18 which are of the same configuration and which for installation of the pipe support 1 are moved radially from the outside over the pipeline R and are connected together at their ends by a connection involving intimate joining of the materials involved, that is to say here they are welded together. The latter is shown by a weld seam 19 indicated in broken lines at the circular ring disc 15 which is at the left in FIG. 3. The weld seam 19 is desirably ground away to such an extent that it does not protrude beyond the cross-section of the circular ring discs 15. Provided on the ring sectors 18 at both sides are bevels 20 for the welding procedure in order to be able to perform an easy welding operation at each of the two sides. When the welding is complete the weld seam 18 is in the form of a double-V-weld seam. Thus, for axial positioning of the pipe receiving means 2 on the pipeline R the components of the abutment device 8, the force application aid 14 which here is in the form of the circular ring disc 15 and the abutment elements can be guided in situ axially laterally against both axial side surfaces 21 here of the thermal insulation 6 and connected to the pipeline R in force-locking and positively locking relationship, here by means of adhesive. Thus the pipe support 1 and the pipeline R are secured in situ in a given relative position with respect to each other.

For radially fitting the pipe receiving means 2 over the pipeline R the procedure adopted is in principle similar as is already known from above-mentioned DE 10 2005 013 728 A1 insofar as the outer shell 4 and the thermal insulation 6 are respectively divided into two shaped portions 22 which are in the form of half-shell portions 21, wherein here the thermal insulation has a stepped division 23 with a gap 24 in the position of installation over the pipe portion Ra. The thermal insulation here is made from a moulded polyurethane foam hollow cylinder which is already prefabricated to the required dimensions and which is then cut at the corresponding stepped division. That has the advantage that the moulded surfaces, that is to say those of the foam hollow cylinder, are closed in a fashion corresponding to the moulding operation and thus involve impeded heat transfer. To avoid thermal bridges the gap 24 is filled with elastic insulating material 28 in the installation position, although this is not explicitly shown here. In addition here the thermal insulation 6 which however is not explicitly shown here is glued to the pipe portion Ra in the installation position. For installing the pipe support 1 the pipe receiving means 2 is moved at a given location radially over the pipeline, its axial position is adapted to any currently prevailing necessities arising for example out of deviations in installation from the planning situation, and possibly bonded in place, wherein during and/or after the bonding step the half-shell portions 21 of the outer shell 4 are moved radially over the thermal insulation 6 and thus braced by means of clamping elements 25 of the holding device 7 over the thermal insulation 6 in such a way that they press the thermal insulation 6 radially inwardly against the pipe portion Ra in the receiving space 3.

For relative axial positional fixing of the outer shell 4 and the thermal insulation 6 with respect to each other the half-shell portions 21 each have a plate-shaped internal ring sector 26 which engages radially in a provided radial and peripheral recess 27 in the thermal insulation 6 and bears axially laterally in the recess 27 against the thermal insulation 6. Moreover, similarly as disclosed in DE 10 2005 013 728 A1 and here expressly referred to, provided between the outer shell 21 and the thermal insulation 6 is further insulating material 29 shown here as dark, for sealing off the thermal insulation 6.

Once again a further substantial advantage of the pipe support 1 according to the invention will be clearly apparent from the detail view in FIGS. 4a and 4b. These Figures show a partial longitudinal section in which the pipeline R, the circular ring disc 15 and the thermal insulation 7 are shown in section. It can be clearly seen from these Figures that the circular ring disc 15 coaxial with the pipeline R is spaced radially from the outside of the pipeline R, wherein the spacing b can here be a few millimetres up to centimetres. That avoids heat transfer from the pipeline R to the circular ring disc 15 as a consequence of heat conduction. In addition the circular ring disc 15 cannot impede or can only slightly impede a thermally induced change in periphery of the pipeline R. In addition any inaccuracies in respect of shape of the ring sectors 18 can be compensated. Furthermore it can be seen from FIGS. 4a and 4b that the abutment elements 9 are fixed on the pipeline R by way of here a fillet weld seam 19. The abutment elements 9 however each bear in a condition of remaining loose against the circular ring disc 15 with their respective narrow side surface 13. That impedes radial and peripheral transmission of force as well as heat transfer between the circular ring disc 15 and the abutment elements 9. In addition that saves on an installation step, connecting abutment elements 9 to the circular ring disc 15. In addition in the embodiment of the pipe support 1 in FIG. 4b, there is elastic insulating material 28 whereby heat transfer from the pipeline R to the circular ring disc 15 is further impeded and positioning of the ring element 16 or the circular ring disc 15 at a radial spacing from the pipeline R is facilitated.

Finally the ring element 16 or the circular ring disc 15 bears against the thermal insulation 6 in a condition of remaining loose laterally, that is to say here by way of the second circular ring side surface 17.2, thereby also achieving the above-mentioned advantages such as reducing heat transfer and peripheral and radial transmission of force.

The shaped portions 22 of the outer shell 4 and the thermal insulation 7 are braced on the pipeline R in the installation position. For that purpose there are provided screw connections S having screw bolts 30 and locked screw nuts 31 as well as projections fixed on the outer shell 4 with screw openings 33 in the peripheral direction u to form the screw connections, as are already substantially known from DE 10 2005 013 728 A1. As a departure therefrom there are provided the clamping elements 25 in the form of plate springs 34 which provide for constant prestressing of the screw connections S. A detail view with a portion of the screw connection S is shown in FIG. 5. At the side towards the plate spring 35 the screw opening 33 has a stepped enlargement 36 with a shoulder 37, against which the plate spring 35 closest to the screw opening 33 is supported in such a way that it tapers from the shoulder 37 conically to the end 38 of the screw bolt 30 and is thus held in an arch-like configuration stably in the screw opening 33. The diameter of the screw opening 33 without enlargement is also larger than the diameter of the screw bolt 30 while an opening (not visible here) in the plate spring is adapted to the outside diameter of the screw bolt 30. Stable support for the plate spring 34 and the differing diameters provide that the screw bolt 30 is held centred in the screw opening 33 and minimum frictional effects occur between the screw bolt 30 or the plate spring 34 and the screw opening 33. That makes it possible to achieve a contact pressure force which remains as uniform as possible and by means of which the pipe receiving means 2 or the thermal insulation 6 is pressed against the pipe portion Ra. As can further be seen from FIG. 5 there are two further plate springs 35. All three plate springs 34, 35 are arranged in known fashion in mutually aligned relationship and in an alternate sequence and are thus virtually "connected in series". That achieves an increase in the size of a spring travel within which the contact pressure force can be kept approximately constant.

The holding device 7 further has a carrier structure 39 here solely for supporting the pipe support 1 at the base B. It includes a support member 40. The support member shown in FIG. 1 is designed in the form of a pure sliding mounting. For that purpose the carrier structure 39 includes a foot element 41 which is fixed to the outer shell 4 and which here is in the form of a U-shaped slider 42 with rounded edges 43 and has a first sliding surface 44 with which the slider 42 can slide on an associated second sliding surface 45 of the support member 40 at the base B. The rounded edges 43 are desirably arranged perpendicularly to the main displacement to be expected in respect of the pipe support 1 as a consequence of thermally induced axial changes in dimension of the pipeline R, the main displacement occurring here in the axial direction x. By virtue of the displaceable mounting of the pipe support 1 the pipeline R can unimpededly expand or contract under a thermal effect so that the pipeline R is subjected to a lesser loading, but a supporting action on the part of the pipe support 1 is maintained.

In the embodiment of the pipe support 1 shown in FIG. 1 the movement of the pipe support 1 is not limited parallel to the sliding surfaces 44, 45 and here perpendicularly upwardly and in corresponding rotations in the sliding surfaces 44, 45 and perpendicularly thereto so that here there are five degrees of freedom in the movement. Almost in contrast thereto the pipe support 1 in its embodiment in FIG. 2b has a support member 40 which is fixed on the base B here by means of screw connections S. Thus that pipe support 1 shown in FIG. 2b is in the form of a fixed-point pipe support. The plate-like base B which is shown in FIGS. 1, 6 and 7 and on which the support member 40 is arranged with the second sliding surface 45 of the pipe support 1 can only be seen in the form of a portion thereof.

The movement and in particular the sliding movement of the slider 42 in the embodiment shown in FIG. 6 of the pipe support 1 are limited in the axial displacement direction v1 in the same way as the axial direction x by means of abutments 46 to a first displacement region 47 while a displacement in the Y-direction y is not limited. The abutments 46 are here in the form of simple angle profiles 48 which are fixed on the base B with a first limb 49 and which, with a second limb 50, oppose an abutment surface 51 to the axial movement of the slider 42.

In the embodiment of the pipe support 1 shown in FIG. 7, in perpendicular relationship to the abutments 46 there are further abutments 46 which are operative perpendicularly to the axial direction x and in sliding surfaces 44, 45, in the form of angle profiles 48, by means of which the sliding movement of the slider 42 is limited in a second displacement direction v2 perpendicularly to the first displacement direction v1, to a second displacement region 52.

A variant of the foot element 41 is shown in the embodiment of the pipe support 1 in FIG. 8. Here the foot element 41 is in the form of a simple rectangular-U-shaped profile fixed to the outer shell 4 with its limbs 41a.

FIGS. 9 to 12 show possible embodiments of the pipe support 1 with different degrees of freedom in respect of its mounting to the base B, wherein the embodiments are the same as those shown in FIG. 1 except for the development of the carrier structure 39, and the pipeline is omitted for the sake of clearer illustration.

In the embodiment shown in FIG. 9 the carrier structure 39 has two projections 53 which are vertical in the installation position and which extend downwardly beyond the first sliding surface and which are arranged in aligned relationship one behind the other with respect to the axial direction x, which are connected to the foot element 41 in the form of a slider 42 in FIG. 1 and are connected by way of a stiffening means 54 to the outer shell 4 and delimit an intermediate space 55 which in the installation position is open downwardly and in the Y-direction y. A base component which here is in the form of a double T-shaped bearer is arranged in corresponding fashion in the Y-direction y, for supporting the foot element 41 with respect to the pipe support 1. Thus the pipe support 1 is mounted displaceably generally in two directions, in the Y-direction y, that is to say horizontally and perpendicularly to the axial direction x, and in the vertical direction z in a second displacement region 52 which is here not further shown as being limited, and in a third displacement region 56 which is delimited by means of the first sliding surface 44 of the slider 42, on the base B, by way of the foot element 41. In FIG. 9 and in following FIGS. 10 and 12 the base component against which the foot element 41 bears is shown at a small spacing relative to the foot element 41 to indicate that, because of the dimensions of the pipeline R and the pipe support 1 which in practice are frequently quite large, it is already advantageous as from assembly to provide here a given play Sp. As that play Sp can certainly be in the range of some centimetres or decimetres, that is strictly speaking to be viewed as a displacement region 47, 52, 56, but in that respect, having regard to the dimensions of the pipeline length which in practice are usually great, there can be a play Sp of some centimetres or decimetres.

In the FIG. 10 embodiment the carrier structure 39, in addition to the embodiment of the pipe support 1 shown in FIG. 9, has two further sliders 42 whose first sliding surfaces 44 face with their surface normals in the installation position in the Y-direction y. For that purpose, corresponding second sliding surfaces 45 associated with the support member 40 are provided at the base B which here is only shown in highly diagrammatic form. As however, except for a given play Sp, as a consequence of the projections 53, axial displaceability of the pipe support 1 is not allowed, the second sliding surfaces serve rather as abutments. Accordingly the pipe support 1, apart from the above-mentioned possible play Sp of up to several centimetres, is supported to the base B displaceably only in the vertical direction z. Nonetheless this structure with slider 42 is considered as having an advantage which is substantial in terms of manufacture and installation of the pipe support 1 as this makes it possible for certain identical components such as the slider 42 to be used for different embodiments of the pipe support 1, in which respect it is only with a given use and installation in respect of the pipe support 1, that they first acquire their function which is actually attributed thereto, that is to say here acting as a sliding mounting or a (large-area) abutment. Thus it is possible to provide for corresponding easier serial manufacture and simpler pre-assembly of the sliding mountings including the foot element prior to fitting the pipe support 1 on the pipeline R.

FIGS. 11a to 11c show embodiments of the pipe support 1 with three possible arrangements of the foot elements 41. As can already be seen purely from a glance the embodiment of the pipe support 1 in FIG. 11a corresponds to that shown in FIG. 1. In FIG. 11b the pipe support 1 has a respective slider 42 having a first sliding surface 44 above and below the pipe receiving means 2 in the installation position, which sliders can be used as abutments in the vertical direction z or for sliding movement of the pipe support 1 in the axial direction x and/or in the Y-direction y, on the base B. In the embodiment of the pipe support 1 in FIG. 11c, vertical movement z and displacement of the pipe support 1 in the axial direction, that is to say in the first displacement direction v1, is possible.

Finally FIG. 12 shows the possible situation of mounting of the pipe support 1 in which the pipe support 1, except for the above-mentioned play Sp, is arranged displaceably only in the axial direction x, as it is supported at both sides in the vertical direction z and in the Y-direction y on the base B which here is in the form of a frame assembly, by way of the foot elements 42 which are in the form of sliders 42.

List of References 1 pipe support
2 pipe receiving means
3 receiving space
4 outer shell
5 insulating system
6 thermal insulation
7 holding device
8 abutment device
9 abutment element
10 connecting side surface
11 fillet weld seam
12 side surface
13 narrow side surface
13.1 narrow side
14 force application aid
15 circular ring disc
16 ring element
17.1 first circular ring side surface
17.2 second circular ring side surface
18 ring sector
19 weld seam
20 bevel
21 half-shell portion
22 shaped portions
23 division
24 gap
25 clamping element
26 internal ring sector
27 recess
28 insulating material
29 insulating material
30 screw bolt 30
31 screw nut
32 projection
33 screw opening
34 plate spring
35 plate spring
36 enlargement
37 shoulder
38 end
39 carrier structure
40 support member
41 foot element
41.1 limb
42 slider
43 edge
44 first sliding surface
45 second sliding surface
46 abutment
47 first displacement region
48 angle profile
49 first limb
50 second limb
51 abutment surface
52 second displacement region
53 projection
54 stiffening means
55 intermediate space
56 third displacement region
b spacing
l longitudinal direction
r radial direction
u peripheral direction
v1 first displacement direction
v2 second displacement direction
v3 third displacement direction
x axial direction
y Y-direction
z vertical direction
S screw connection
Sp play
B base
R pipeline
Ra pipe portion

The invention claimed is:

1. A cold-insulated pipe support for a pipeline, comprising a pipe receiving means which delimits a receiving space for a pipe portion of the pipeline and which has an outer shell and an insulating system which is arranged between the outer shell and the receiving space and has a thermal insulation of solid insulating material, and a holding device for receiving and transmitting pipe forces and force moments acting on the pipeline and on a base, wherein the holding device has an abutment device having at least one abutment element at least for receiving and transmitting axial pipe forces to the pipe receiving means and/or to the base, the abutment element is fixed in on a narrow-area side surface on the outside on the pipeline, which side surface extends longitudinally in the axial direction and is in the form of a connecting side surface and the at least one abutment element engages the pipe receiving means in axially force-operative relationship by way of a provided force application aid, characterised in that the force application aid bears against the at least one abutment element in a condition of remaining loose connection therebetween, and characterised in that the force application aid is in the form of a ring element which is arranged at least in partial peripheral relationship and having a side surface which extends in the cross-sectional plane and which is towards the pipe receiving means and which acts axially on the pipe receiving means.

2. A pipe support according to claim 1 characterised in that there is provided at least one respective abutment element at both sides of the pipe receiving means with respect to the axial direction.

3. A pipe support according to claim 1 characterised in that the abutment element is of a plate-shaped configuration having large side surfaces and narrow side surfaces connecting the large side surfaces, wherein one of the narrow side surfaces provides the connecting side surface for fixing the abutment element to the pipeline.

4. A pipe support according to claim 1 characterised in that the ring element bears against the thermal insulation in a condition of remaining loose at least with respect to the axial direction.

5. A pipe support according to claim 4 characterised in that the ring element has an inside radius and the ring element is arranged in coaxially and radially spaced relationship with the pipeline with respect to the inside radius.

6. A pipe support according to claim 4 characterised in that the ring element is in the form of a circular ring disc.

7. A pipe support according to claim 4 characterised in that the ring element is composed of at least two ring sectors which for installation of the pipe support over the pipeline can be moved radially from the outside over the pipeline and can be fixed together at the ends.

8. A pipe support according to claim 1 characterised in that the holding device has a carrier structure for supporting and/or suspending the pipe support at the base and the pipe support is mounted to the base in slidingly displaceable and/or rollingly displaceable relationship by means of the carrier structure within a first displacement region in an axial first displacement direction, within a second displacement region in a tangential second displacement direction perpendicular to the first displacement direction and/or within a third displacement region in a radial third displacement direction perpendicular to the first displacement direction and the second displacement direction.

9. A pipe support according to claim 8 characterised in that the carrier structure has a foot element which is fixedly connected to the pipe receiving means and which extends radially from the pipe receiving means and the foot element is mounted to the base in slidingly displaceable relationship in the first displacement region and/or the second displacement region.

10. A pipe support according to claim 8 characterised in that at least one of the displacement regions is delimited at its end by means of abutments.

11. A pipe support according to claim 10 characterised in that the abutments are in the form of angle profiles having a side surface which is arranged perpendicularly to the respectively associated displacement direction and which is in the form of an abutment surface and the angle profiles can be fixed to the base.

12. A pipe support according to claim 1 characterised in that the thermal insulation is fixed on the pipeline.

13. A pipe support according to claim 12 characterised in that the thermal insulation is glued to the pipeline.

14. A pipe support according to claim 1 characterised in that the outer shell and the thermal insulation respectively have at least one division in shape having a division perpendicularly to the cross-sectional plane of the pipe receiving means such that the outer shell and the thermal insulation are divided into shaped portions.

15. A pipe support according to claim 14 characterised in that the holding device has clamping elements for bracing the shaped portions of the outer shell and/or the thermal insulation and pressing same on the pipeline.

16. A pipe support according to claim 1 characterised in that there is provided at least one internal ring sector, the internal ring sector is fixed at a spacing relative to axial end regions of the outer shell and is fixed at the inside to the outer shell and the internal ring sector extends radially inwardly into the thermal insulation and bears thereagainst in positively locking and/or force-locking relationship.

17. A method of installation of a cold-insulated pipe support over a pipeline, wherein the cold-insulated pipe support comprises a pipe receiving means which delimits a receiving space for a pipe portion of the pipeline and which has an outer shell and an insulating system which is arranged between the outer shell and the receiving space and has a thermal insulation of solid insulating material, and a holding device for receiving and transmitting pipe forces and force moments acting on the pipeline and on a base, wherein the holding device has an abutment device having at least one abutment element at least for receiving and transmitting axial pipe forces to the pipe receiving means and/or to the base, and wherein the outer shell and the thermal insulation each have at least one division in shape with a division perpendicularly to the cross-sectional plane of the pipe receiving means, the method comprising the steps:

applying the shaped portions of the pipe receiving means, that are formed by the division in shape, radially over the pipeline and fixing the shaped portions with their respective division against each other in a relative position relative to each other, positioning and fixing at least one respective abutment element at both sides of the pipe receiving means with respect to the axial direction at a narrow-area side surface which extends in the axial direction of the pipeline longitudinally and which is in the form of a connecting side surface to the pipeline at the outside so that the abutment element bears indirectly by way of a force application aid or directly in force-locking and/or positively locking relationship in the axial direction against the pipe receiving means, wherein the force application aid bears against the abutment element in a condition of remaining loose connection therebetween, and wherein the force application aid is in the form of a circular ring disc divided into at least two ring sectors for radial installation, characterised in that the ring sectors are moved radially over the pipeline prior to, with or after installation of the pipe support over the pipe portion and are assembled together to provide the circular ring disc and are welded, wherein there is provided a circular ring disc at least on one side of the pipe receiving means with respect to the axial direction.

18. The method according to claim 17 wherein the circular ring disc has an inside radius which is larger than the outside diameter of the pipeline or the pipe portion, and includes a first circular ring side surface that is towards the abutment element and a second circular ring side surface which is towards the pipe receiving means and which acts axially laterally on the pipe receiving means, characterised in that the assembled circular ring disc is positioned coaxially relative to the pipe portion prior to fixing of the associated abutment elements and is positioned at its second circular ring side surface for contact in force-locking and/or positively locking relationship axially at the end at the thermal insulation and the abutment elements are guided axially against the first circular ring surface and are fixed to the pipeline at the outside.

19. The method according to claim 18 wherein the holding device has a carrier structure for supporting and/or suspending the pipe support at the base, characterised in that the carrier structure is moved prior to, with or after installation of the pipe support on the outside for support in force-locking and/or positively locking relationship of the pipe support and/or suspension in force-locking and/or positively locking relationship of the pipe support on the base.

* * * * *